RUSSELL G. THOMPSON
CLAYTON E. HUNT, JR.
INVENTORS

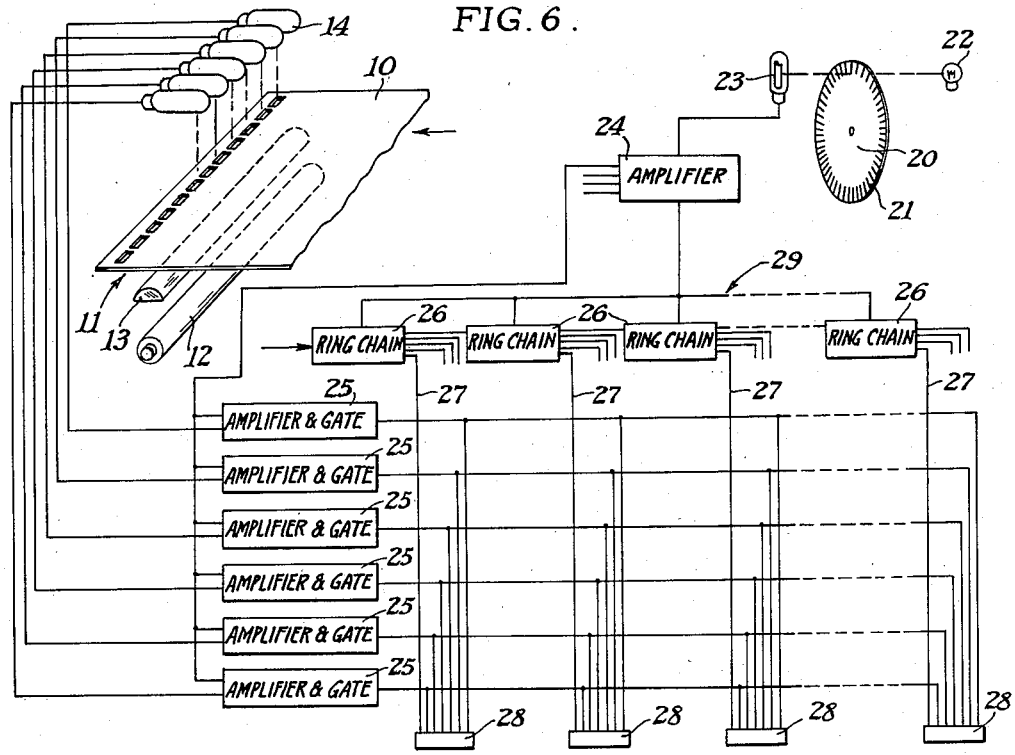
FIG. 6.
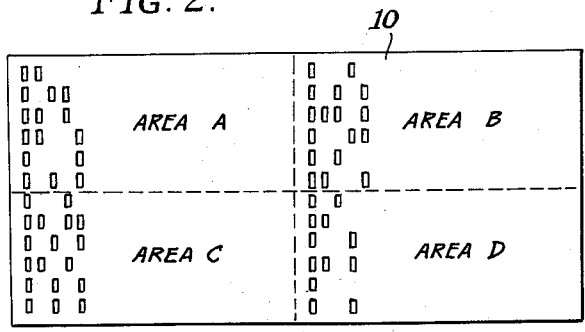
FIG. 2.
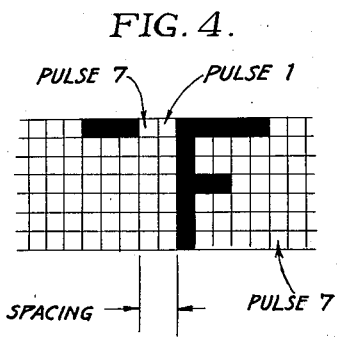
FIG. 4.
FIG. 3.
RUSSELL G. THOMPSON
CLAYTON E. HUNT, JR.
INVENTORS Aug. 11, 1959   R. G. THOMPSON ET AL   2,899,498
APPARATUS FOR SYNTHESIZING FACSIMILE SIGNALS FROM CODED SIGNALS
Filed Nov. 30, 1953   7 Sheets-Sheet 3

RUSSELL G. THOMPSON
CLAYTON E. HUNT, JR.
INVENTORS

BY

ATTORNEY & AGENT

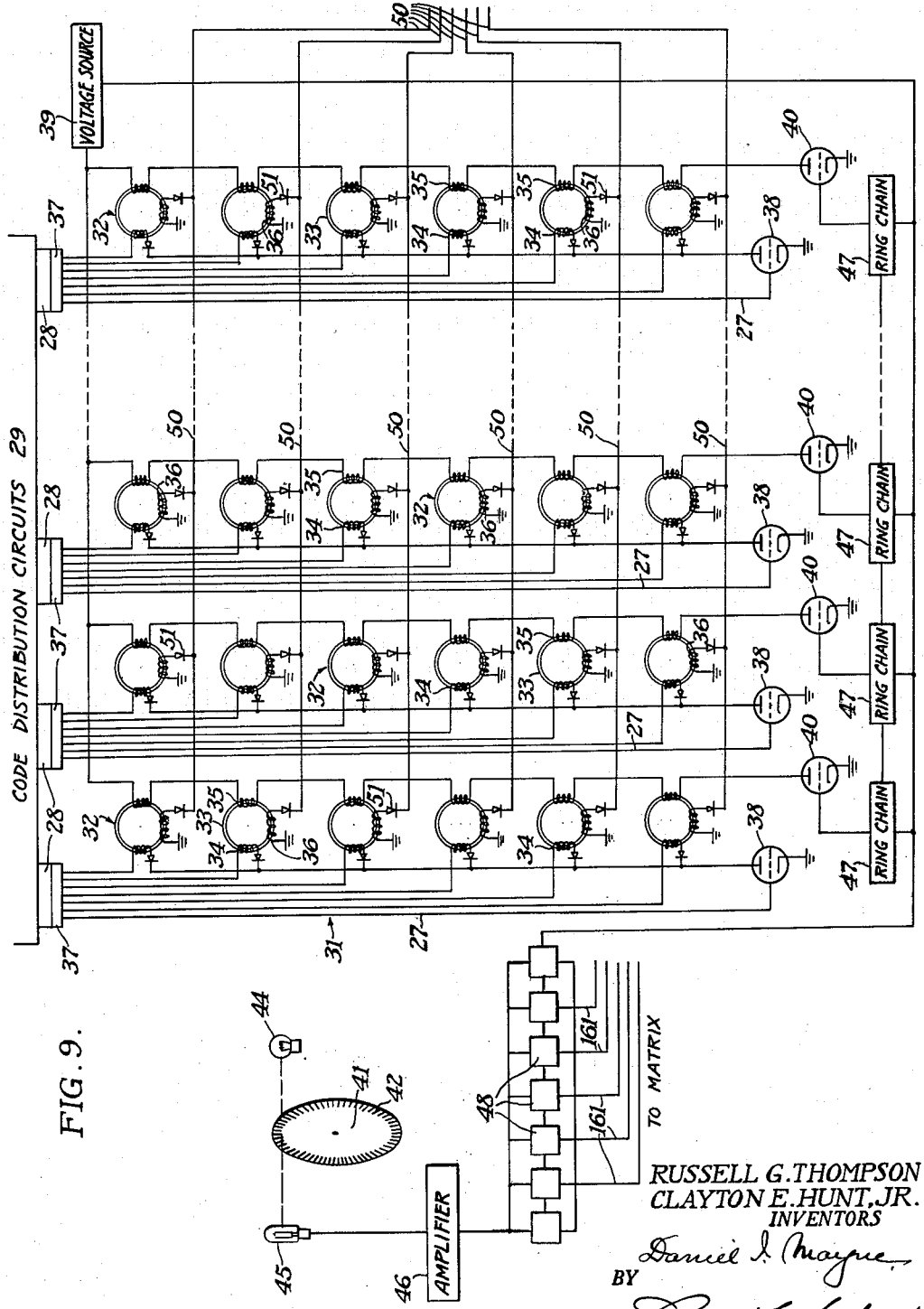

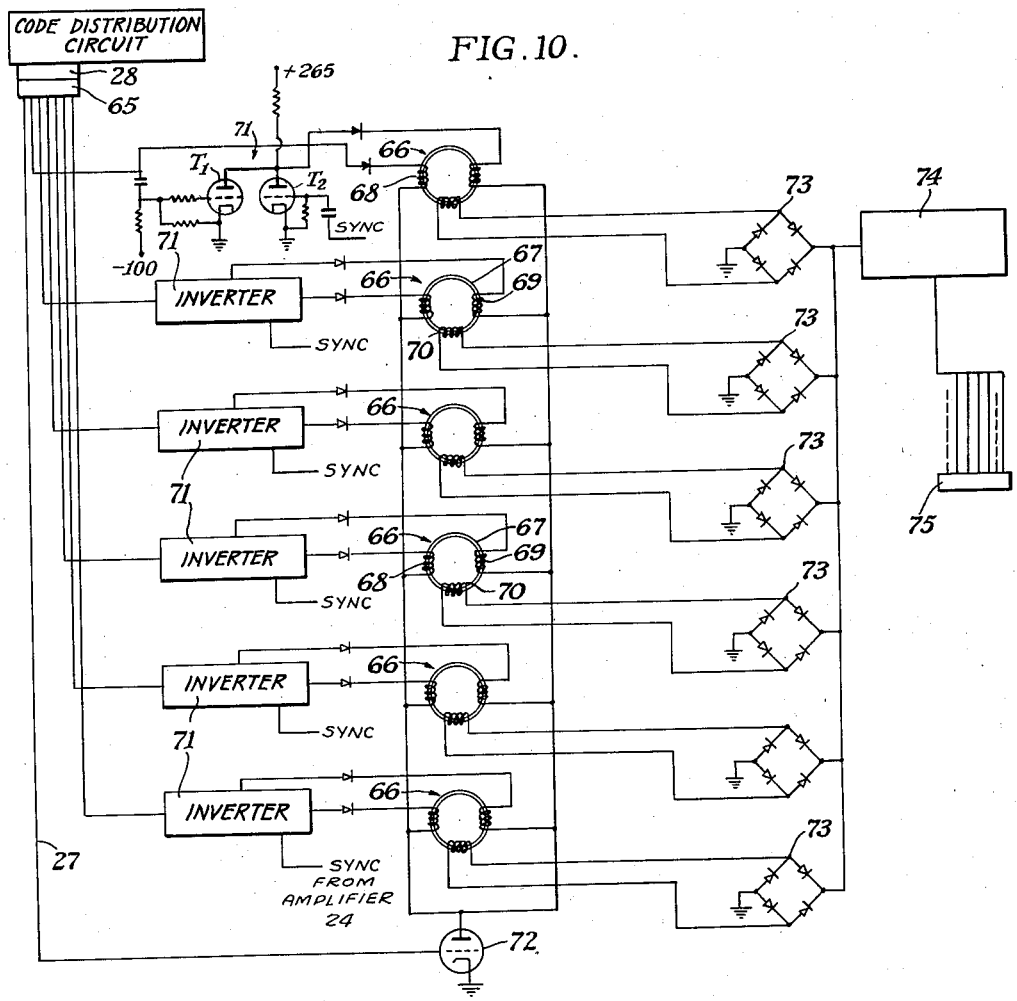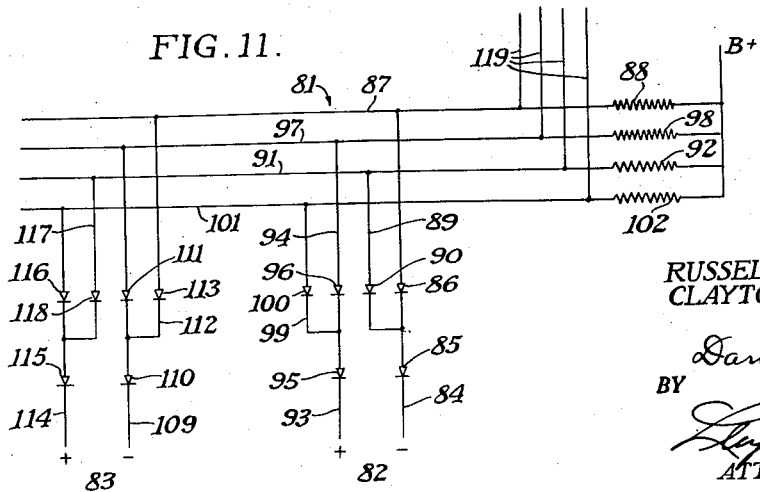

RUSSELL G. THOMPSON
CLAYTON E. HUNT, JR.
INVENTORS

ATTORNEY & AGENT

2,899,498

APPARATUS FOR SYNTHESIZING FACSIMILE SIGNALS FROM CODED SIGNALS

Russell G. Thompson and Clayton E. Hunt, Jr., Rochester, N.Y., assignors to Eastman Kodak Company, Rochester, N.Y., a corporation of New Jersey Application November 30, 1953, Serial No. 394,926

17 Claims. (Cl. 178—22)

This invention relates to facsimile apparatus and more particularly to a translating device which generates and records fascimile signals corresponding to the characters represented by received coded signals.

The present invention deals with apparatus which will print legible characters from an input signal at extremely high speeds, such as the printer disclosed in U.S. Patent No. 2,659,652 in the name of Russell G. Thompson, which is shown in U.S. Patent No. Re. 23,713 in the name of Clayton E. Hunt, Jr., as being used in conjunction with a circuit arrangement capable of analyzing a coded signal and posting a voltage on a terminal individual to the character represented by the signal.

In utilizing the circuitry described in the latter of the above-mentioned patents for an address label printer in which the coded signals are derived from scanned punched cards, it was found that differences in the arrangement of the coded information necessitated a distribution circuit which included a memory circuit to permit changing the printing of a line of characters with respect to their positions on the card. In addition to the memory circuit, it was found that repetition of the same line of coded information on each punched card could be accomplished by utilizing a single punched card, thereby eliminating the necessity for repetitiously punching the same code in a large number of cards. Further, by utilizing non-linear resistances and connecting said resistances to the matrix in combinations common to more than one character, the number of resistances in the network is reduced by about one-half. Since it is desirable to separate the labels of one town or city from those of another, a circuit for marking the tape with a distinctive symbol has also been incorporated.

As stated above, the lack of standardized punching of coded information on the card necessitated a memory system which was flexible and readily adaptable to the cards being used. More specifically, a four line address which includes name, street address, city and state and a line containing an account number, expiration date, etc., is punched in a card with a single line of intelligence coded in each of the four areas provided on the card. Therefore, since the areas are not specifically designated for the code of any one line, each line is punched in an area in accordance with the most advantageous position depending on the user's business methods. In one business, therefore, the name may be punched in one area whereas another business may deem it advantageous to place the account number in that area. Since these same cards are utilized for printing the address labels, the variations in the location of the same coded information necessitates a very flexible system, that is, one which can be readily adapted to the cards being used so as not to necessitate a completely new set of cards.

In the embodiment of the invention hereinafter described, the electromechanical printer operates from a coded signal supplied from the scanning of automatically fed punched cards. The code for each letter is devised from a binary code which contains six elements. Each character of each line is coded in a line and the lines are arranged successively in each area. One form of tabulating card has 12 rows and 80 columns in which the code may be arranged. In most instances, this area is divided into four parts, each comprising 6 rows and 40 columns. Since it has been found that in most instances 24 columns are sufficient in each area, the space between the areas permits scanning of the four areas simultaneously. The coded signal releases a predetermined sequence of operations to print the entire built-up rectangular-dot character automatically from a 5 x 7 dot rectangle, five rows of seven dots for serial printing. The number, variety and form of the characters desired are provided for in the electronic decoder and electronic matrix connections.

The printing is done by a single row of seven styli, each stylus being operated by an independent polarized relay to print or not print in accordance with the predetermined pattern of the amplified signals released by the matrix. Such a printer is fully disclosed in the above Thompson patent. The styli strike impact blows on carbon paper to print carbon dots, row by row, on the paper thereunder for the character signaled. The complete system stores the signals received from the cards, rearranges them in the proper sequence for printing, then decodes the signals, and translates them in predetermined combinations and sequences of signals for the printing styli to print the corresponding characters. The memory system interposed between the distribution circuit and the decoder and matrix provides considerable flexibility in the location of the printing from any one of the columns or any one of the areas. By altering one or more units of the memory system, these units are utilized to denote a change in signal for printing a mark indicative of a change, for example, in a city group of cards. A fixed card station permits the use of a single punched card which is common to a group of cards, such as city and state names, date, etc., to be plugged into the analyzer or decoder to print at any place in the address in the same manner as signals from the card feed. This permits the capacity of the card to be extended by eliminating repetitious punching. By utilizing germanium crystal diodes, which have non-linear resistance properties, and combining such diodes in combinations common to more than one character, the connections to the matrix of the coded signal is greatly simplified.

The primary object of the invention is, therefore, to provide a circuit arrangement which is capable of distributing coded signals and posting said signals on terminals individual to the characters represented by the signals.

Another object of the invention is to provide a circuit arrangement which is capable of distributing coded signals and includes a memory system for delivering said signals individual to the characters represented by the signals in any predetermined order.

Yet another object of the invention is to provide a circuit arrangement which is capable of distributing coded signals and includes a memory system having a part thereof for delivery of a predetermined signal indicative of a change in the coded signals and individual to a character or characters designating such change.

Still another object of the invention is to provide a circuit arrangement which is capable of distributing coded signals and includes a station for repetitiously delivering coded signals individual to characters common to a group of mediums.

And another object of the invention is to provide a circuit arrangement which is capable of distributing coded signals and delivering voltages individual to the characters represented by the signals to a matrix of switching elements by means of non-linear resistances combining those relays common to more than one character.

These and other objects and advantages will be readily apparent to those skilled in the art by the description which follows.

Reference is now made to the accompanying drawings wherein like reference numerals designate like parts and wherein:

Fig. 2 is a plan view of a punched card showing the relation of the code areas;

Fig. 3 is a diagrammatic view showing two scanning stations for deriving coded signals from each coded area of the card simultaneously;

Fig. 4 shows the formation of a letter in the 5 x 7 dot rectangle;

Fig. 6 is a schematic diagram of the apparatus and circuits for receiving and distributing the coded signals derived from the punched cards;

Fig. 9 is a schematic view of the apparatus and circuits comprising the memory system;

Fig. 10 is a schematic view of one of the modified memory units for determining a change in the coded signal designating a certain town, city, or information common to a large group of cards;

Fig. 11 is a portion of the decoding circuit for delivering voltages representative of the character to the matrix circuit;

The apparatus to be described for the purpose of disclosing the invention has been designed to record or print all characters with a definition in height of seven lines and with five-line definition in width, see Fig. 4. More or fewer lines may be employed as desired, but it is believed that seven-by-five definition gives the lowest resolving power which can be tolerated when it is desirable to print characters which are easily legible. For printing characters as well as digits, a six element binary code for the coded signals is preferred. These signals may originate in any manner but the invention contemplates their derivation from a medium such as punched tabulating cards. Any other code, of course, may be used as long as it meets the requirement that unique voltage patterns may be derived from each coded character signal.

Card feeding mechanisms for moving cards under sensing brushes and means for advancing recording tapes or mediums past the printing anvil are so well known that their description herein is deemed to be unnecessary.

Figure 1:
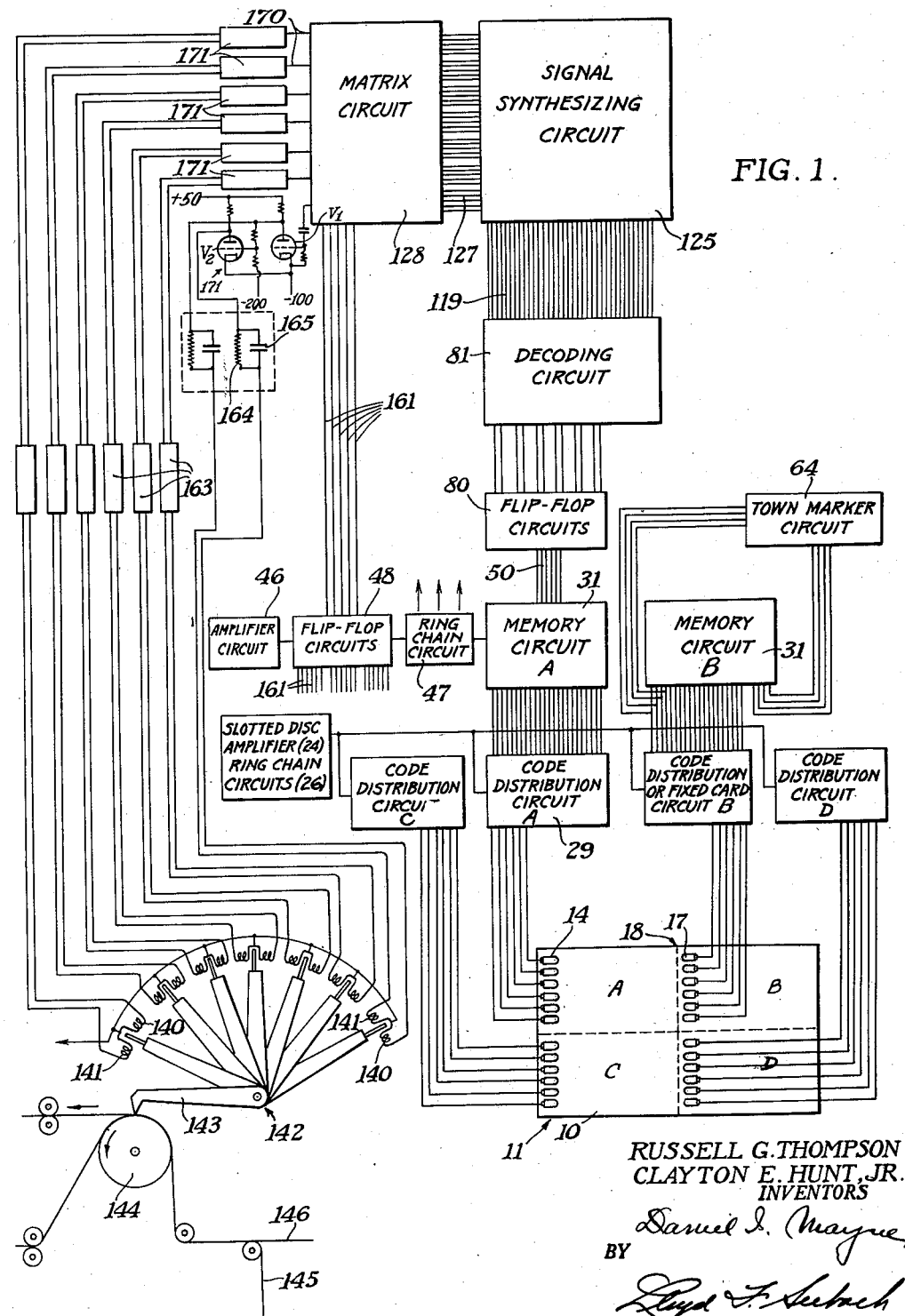
Fig. 1 is a schematic diagram of the various circuits utilized in a unit for recording from a punched card or tape.

With reference to Figs. 1–3, the punched card 10 is divided into four areas A, B, C and D, each area having 40 columns of 6 rows for coding each character in one of the lines of the address. As stated hereinbefore, only 24 columns are utilized in each area and the information comprising the four line address may be arranged in any order in the four areas. As shown in Fig. 2, the information is punched in the successive lines, six rows being available for the code of each character. The cards 10 are fed continuously in a lengthwise direction at a constant speed with respect to the scanning stations, as indicated by numerals 11 and 18. A lamp 12 is located under the card in station 11 and the light therefrom is uniformly spread by lens 13 across the row of coded punchings which permit the light to fall on a row of photocells 14. A second lamp 15, lens 16 and a second row of photocells 17 are arranged, as shown in Fig. 3, in the second scanning station 18 thereby permitting each area to be scanned simultaneously. Since card 10, as shown in Fig. 2, comprises areas A, B, C and D having twenty-four columns of six rows each, each row of photocells 14 and 17 includes twelve photocells, six cells being associated with each scanned area. The cards 10 are fed continuously past the groups of cells 14 and 17 so that the lines of coded characters are scanned successively and the number of cells energized in each row will vary, therefore, with the code and will provide signals which are individual to the character represented by the code.

In order to insure synchronization of the card feed and the successive scanning of the lines, see Fig. 6, a disc 20 is provided with a number of radial slots 21 equivalent in number to the number of lines on the card and is geared or directly connected to the card feed. A light source 22 is arranged on one side of the disc and a photocell 23 on the other side thereof. The light transmitted through slots 21 and falling on photocell 23 provides a signal which is utilized as a synchronizing signal for each card column passing the rows of photocells 14 and 17. The signals from photocell 23 are connected to an amplifier 24 which, in turn, delivers the amplified signal to each of the amplifier and gating circuits 25. The signals from six of photocells 14 are connected respectively to each of amplifier and gating circuits 25. Since the binary code is of six elements, six of tubes 14 are utilized for coding area A and six for area C. Likewise, six of photocells 17 are associated with area B and six with area D. Accordingly, the circuits shown in Fig. 6 are for the coded signal derived from one area or, in other words, produce the signals individual to the characters in only one line of the address. The signal from amplifier 24 is, therefore, connected to four such groups of circuits 25, each group being associated with a different area of card 10. The signals from cells 14 are gated by the signal from amplifier 24 to make short pulses. The signals from amplifier 24 are also sent to ring chains 26 which are equivalent in number to the number of coded lines to be used in each area on card 10. Ring chains 26 have the property of being stepped along by the disc signal so that output pulses are delivered successively to leads 27 connected to sockets 28, each socket corresponding to a card column. In an arrangement, as shown in Fig. 3, in which areas A, B, C and D are scanned simultaneously, four such groups of amplifiers 25 and sockets 28 will be used and each group will be stepped by the single disc 20, as indicated by the unconnected lines extending from amplifier 24 and ring chains 26.

The code distribution means or circuit 29 receives a start signal when a card is part way through the scanning station, that is, at a time the last line of code in areas A and C is past photocells 17 and before the first line of code in these areas is aligned with photocells 14. Each of the four scanning or reading stations sends out a group of signals from its photocells 14 and 17 as each column of the card passes thereunder. The card signals are amplified and gated with the disc signal to insure exact synchronism and are delivered to sockets 28. As a result, an electrical signal representative of the character coded in each line on the card 10 is posted on one or more of the terminals of each socket 28 successively. Since each letter or digit will be represented by the energization of a different combination of the six cells associated with each area, the signals will be applied to the terminals on sockets 28 associated with the cells so energized.

Figure 5:
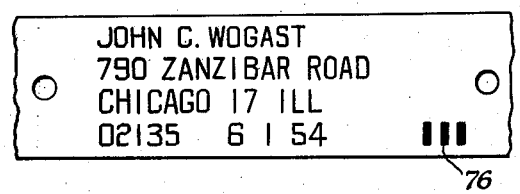
Fig. 5 shows the arrangement of a four line address on the tape with a town mark.

In the event, the line of information coded in each area of card 10 is not coded in the proper area to provide an order of name, street address, city and state and other information, as shown in Fig. 5, it was found to be desirable to utilize a memory system or circuit 31 which would eliminate the necessity for punching another group of cards. The memory system about to be described and shown in Fig. 9 permits the use of punched cards irrespective of the arrangement of the information in the areas thereof and permits the information to be rearranged in any predetermined manner. Such a memory system or circuit comprises a plurality of static magnetic memory units 32 having a core 33, a read-in coil 34, a read-out coil 35 and an output coil 36. Each of the units are arranged in assemblies or groups of six units in accordance with the number of elements in the binary code and correspond to the one character coded in each line on card 10, and the number of such assemblies is equivalent to the number of lines in each area. Each memory unit has the property that a pulse in coil 34 will magnetize core 33 in one direction and a pulse in coil 35 will magnetize it in the opposite direction, coil 36 having an output only when the direction of magnetization is reversed. From Fig. 9 it will be noted that plugs 37 engage sockets 28 and that coils 34 are connected thereto for receiving any signal delivered to its respective terminal on socket 28 and lines 27 are connected in each instance to the control grids of thyratrons 38. The read-out coils 35 of each assembly are connected in series circuit with a voltage source 39 and the anode of thyratrons 40. A revolving disc 41 provided with slots 42 and synchronized with the movement of tape 145 in the printer to be described hereinafter has a light source 44 arranged on one side thereof and a photocell 45 on the other side which is energized by the light transmitted through the slots. The synchronization is such that for each character seven pulses are sent out by photocell 45. These pulses are amplified by amplifier circuit 46 and sent to ring chains 47 by means of seven flip-flop circuits 48 which are connected so that pulses are sent from each in turn. Five of these pulses are utilized to sequentially operate the printer and the seventh is utilized to step the read-out ring chains 47 once for every seven pulses and to pulse the voltage source 39. Since each of ring chains 47 is also connected to the control grid of its respective thyratron 40, energization of read-out coils 35 is also controlled by ring chains 47.

If for each line scanned signals are put in one or more of the read-in coils 34 of each assembly and read-out coils 35 are pulsed at any time thereafter, a signal is induced in each output coil 36 of the assembly in which the direction of magnetization has been changed by the read-in coils. As a result, an electrical signal is applied to the respective common output leads 50 through diodes 51, the common leads 50 being connected to flip-flop circuits 80. If any of the read-in coils 34 are not pulsed by a signal from distribution circuit 29 and read-out coils 35 are pulsed later, no signal will be induced in the output coils of such units. Successive groups of signals corresponding to the characters to be printed are, therefore, sent out over lines 50 to the flip-flop circuits 80. Thus, the coded signals derived from the punched lines of card 10 go into all sockets 28 associated with a particular set and combination of photocells and are applied to all memory assemblies connected to those sockets. By the use of two scanning stations for reading the four areas, it is possible to read-in more quickly and to be reading in information in some memory assemblies at the same time as others are reading out, so that both operations may go on simultaneously and only one memory system is required. Although the lines on card 10 are scanned successively and the coded signals are delivered in the same order to sockets 28, plugs 37 may be connected in any predetermined order to said sockets, thereby permitting printing of each character in the order so connected. In the same manner, sockets 28 associated with one area may be connected to the memory system of another area and in any predetermined order to arrange the lines of printed characters in a predetermined order. It is readily apparent, therefore, that the memory system provides a very flexible arrangement with respect to the coded information on the card.

Figure 8:
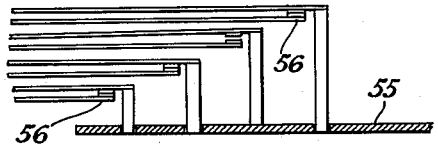
Fig. 8 is a detail view showing the manner in which the contacts of the fixed station circuit are maintained.
Figure 7:
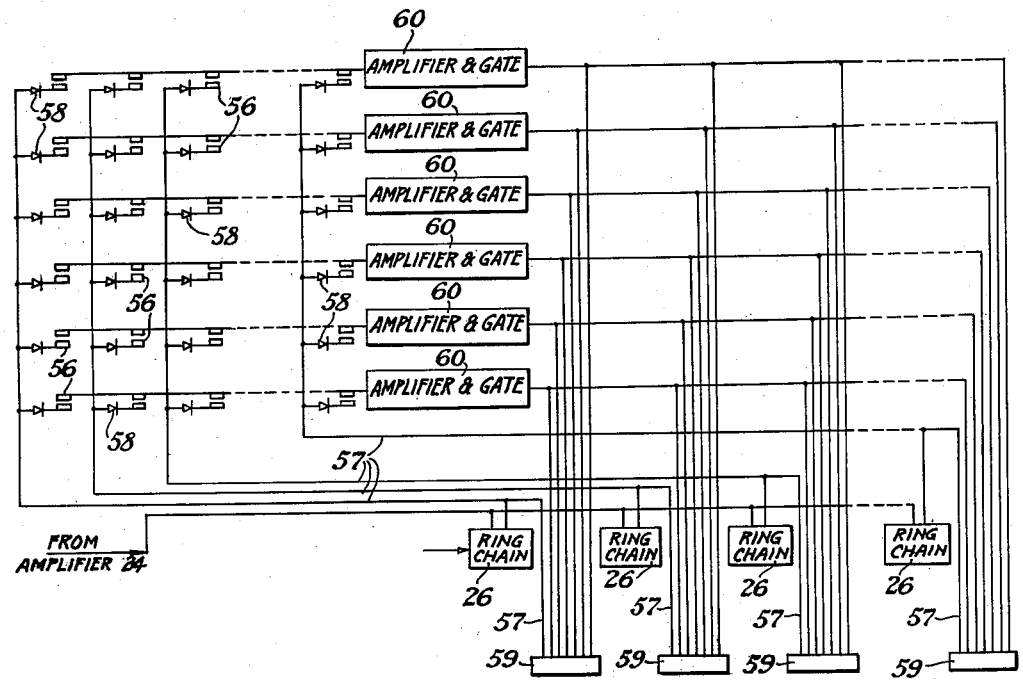
Fig. 7 is a schematic view of the fixed station circuit.

In the event it is desired to print address labels for a magazine having a large circulation, the number of magazines bearing a common address line "New York, N.Y.," "Chicago, Ill.," etc., may be an exceedingly large number. By utilizing a single card having the common address line coded thereon in the proper area, the code punching of many cards can be eliminated thereby resulting in a saving of time. Such a single card is positioned in a stationary unit separate from the card feed and remains in the fixed position until all the cards having the common address line are fed past the scanning station. With reference to Figs. 7 and 8, card 55 is inserted between a plurality of contacts 56 biased into a closed position and spaced in accordance with the twenty-four column, six-row possible arrangement of the punched holes or apertures in the designated card area. The contacts aligned with the apertures will, of course, remain in the closed position, as shown in Fig. 8 whereas the other contacts will be separated by the card and will, therefore, be maintained in an open position. Ring chains 26, which are the same as those shown in Fig. 6 receive a signal from amplifier 24 and send successive pulses through lines 57 to the contacts 56 through isolating diodes 58 and to a set of sockets 59. Any of contacts 56 which are closed allow the pulses to go to the respective amplifier and gating circuits 60 which are also connected to sockets 59 of which there is one for each line of possible coding on the card area. The amplifier gating circuits 25 and 60 can be of the Rossi type shown in the text "High-Speed Computing Devices" published by the McGraw-Hill Book Company. When memory assemblies such as shown in Fig. 9 are plugged or connected to sockets 59, each successive pulse of ring chains 26 will be sent through whichever contacts are closed, and will be read into the respective assembly. These signals will then be read out to print in their proper sequence, as described hereinbefore.

When address labels are printed on a continuous strip of tape, it is desirable to have an identifying mark on the tape to separate the labels of different towns or cities. For this purpose an auxiliary memory system, or town marker circuit 64, similar to that disclosed in Fig. 10 is utilized. With respect to Fig. 10, a single plug 65 is shown connected to a socket 28 associated with the distribution circuit 29 which, in turn, is associated with the address line carrying the coded characters for the town or city. While only one unit has been shown, it is preferable to use more than one, as shown in Fig. 1, so that towns or cities having the same first letter or the same first two or three letters can be differentiated. Each assembly comprises a number of static magnetic units 66 equivalent in number to the number of elements in the binary code. The units include a core 67, a read-in coil 68, a read-out coil 69 and an output coil 70. The signals from plug 65 are fed through inverters 71 to both read-in coils 68 and read-out coils 69 which are jointly connected to the anode of thyratron 72, the control grid thereof being connected to line 27 of respective ring chain 26. Inverters 71 can be a conventional triode And circuit, such as disclosed on p. 400 in the text "Pulse and Digital Circuits" published by the McGraw-Hill Book Company. As described with respect to the memory system, a change in polarity of coils 68 and 69 will induce an electrical signal in output coils 70 which is fed through rectifiers 73 to amplifier 74. Each of inverters 71 comprise two tubes T1 and T2 whose plates are interconnected and whose control grids are connected, respectively, to one of the terminals of plug 65 and to amplifier 24 for receiving a synchronizing pulse therefrom. T1 is normally non-conducting and T2 is normally conducting. The synchronizing signals into T2 provide a positive pulse on the plate thereof only if there is no signal applied to T1. The output signals are, therefore, inverse to those of input. Since any input signal to T1 occurs simultaneously with the signals to T2, there is no output signal. Accordingly, if a signal comes from the card, the read-in coil is pulsed and if no signal is provided, the read-out coil is pulsed. In this way, as long as the same signal comes from each succeeding card, there is no change in the direction of magnetization of the coils and no signal is induced in output coil 70. However, if a different signal is received from the card, one or more of the memory units 66 will be reversed and a signal will come from one or more of the output coils 70 through respective rectifiers 73 to amplifier 74. Rectifiers 73 assure that the signal to amplifier 74 will always be of the same polarity regardless of the polarity of the output from coils 70. Amplifier 74 is connected to socket 75 into which one of the memory units 32 is connected. However, it is connected only to certain terminals which correspond to the code for a special town marker character of any desired configuration. Socket 75 is then connected to one of the last memory assemblies associated with the respective address line and thus when the change of town unit is plugged into a particular socket 28 a change of character in that column will actuate the assembly setting the memory assemblies to print the desired mark or marks 76 in its proper place on the tape, as shown in Fig. 5. Since plug 65 and any additional assemblies that may be added for differentiating more than one character are connected to one or more of the first lines, it is necessary to provide a connection which will also permit plugs 37 to be connected to socket 28 in order to feed these signals to the memory systems to print the first or additional characters in the usual manner.

The signals induced in output coils 36 of the memory system and fed through diodes 51 to lines 50 are sent to a group of six flip-flop circuits 80 which, in turn, deliver a plus or minus signal to a decoding circuit 81 disclosed in part in Fig. 11. Such a circuit discloses the leads 82 and 83 of only two of the six sets of such leads connecting the flip-flop circuits and the decoding circuit. The minus lead 84 is connected through diodes 85 and 86 to line 87 which through resistor 88 is connected to a B plus source of potential, and by means of line 89 and diode 90 is connected to line 91 which is also connected through resistor 92 to the B plus source. In a similar manner, the plus lead 93 is connected to the source by line 94 through diodes 95 and 96 and line 97 and resistor 98, and by line 99 through diode 100 to line 101 and resistor 102. Leads 83 are also connected to the B plus source by means of lines 87, 91, 97 and 101 and resistors 88, 92, 98 and 102. The minus lead 109 is connected to line 97 through diodes 110 and 111 and to line 87 by line 112 and diode 113. Plus lead 114 is connected to line 101 through diodes 115 and 116 and to line 91 by line 117 and diode 118.

The signals delivered to flip-flop circuits 80 by leads 50 of memory circuit 31 will be in accordance with the code on each line of the card. As a result, the decoding circuit 81 must provide a number of different voltages in accordance with the number of characters, namely the full alphabet and the numerals one through nine, zero and the letter "O" being interchangeable. Therefore, the various combinations of signals to the decoder will result in signals being delivered to outputs 119 which will be of different voltages, each signal being representative of the character defined by the combination of signals delivered by lines 50 to flip-flop circuits 80. For example, in Fig. 11, it can be seen that the only terminal on which the voltage from the B plus source will appear is the right-hand output 119. For a signal to be applied to one of the outputs 119, it is necessary that the lines connected to the lines in which the resistors are inserted be of positive polarity. In the disclosure, the positive leads 93 and 114 connected to line 101 through diodes 115 and 116 and 95 and 100, respectively, both provide a positive pulse. With respect to line 91, this line is connected through diode 118 to positive lead 114 whereas line 89 is connected to negative lead 84 through diode 90. Likewise, line 97 is connected to negative lead 109 and positive lead 93, whereas line 87 is connected to both negative leads 84 and 109. The combination provided permits a signal to be delivered only to that output 119 to which only plus signals are delivered. By expanding this circuit to include the six flip-flop circuits 80 and combining the network so that the signals therefrom are representative of the various characters and the number of outputs 119 are equal to the number of characters to be coded, a signal is delivered by each of outputs 119 to the signal synthesizing circuit 125.

Figure 12:
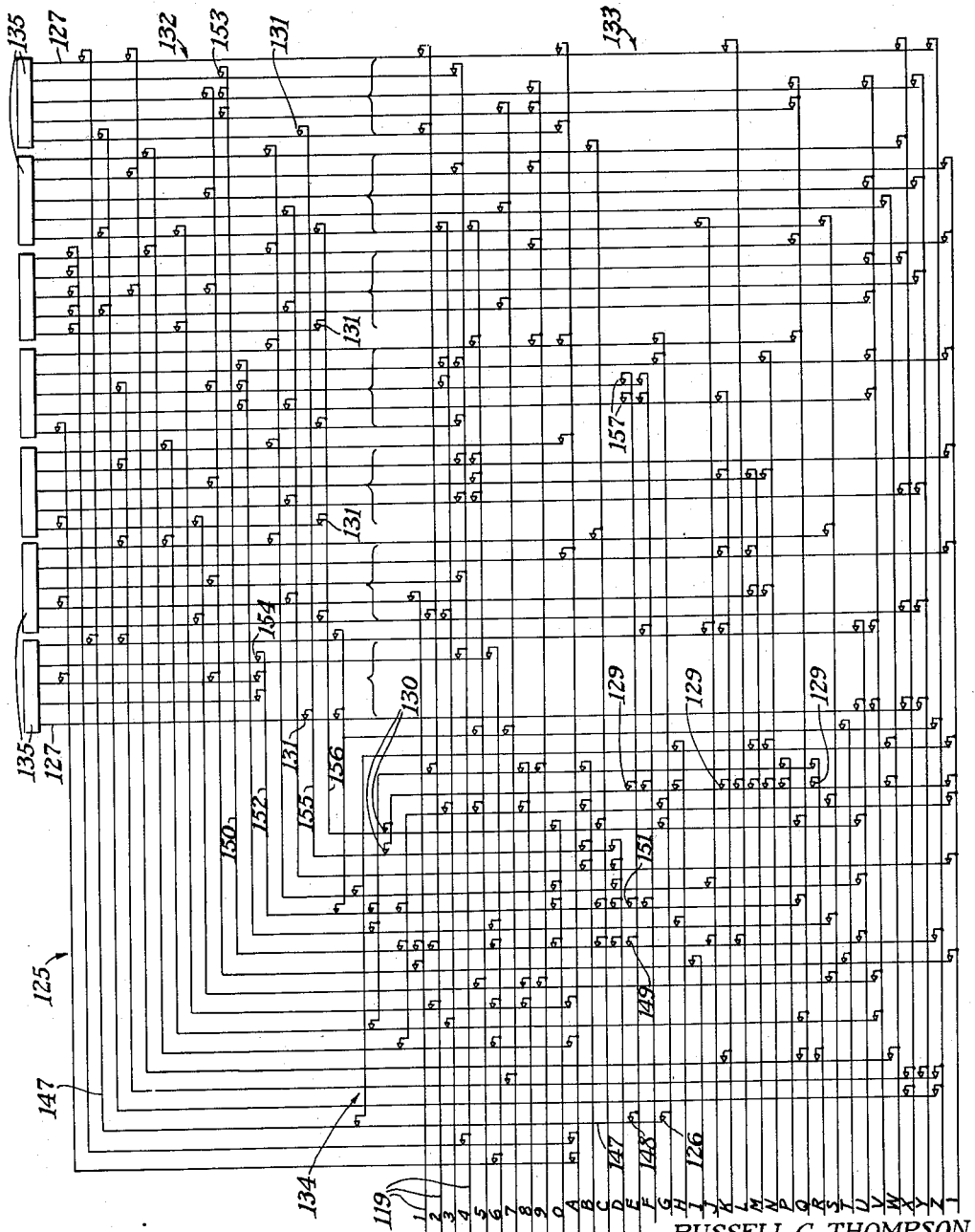
Fig. 12 shows the arrangement of the network of non-linear resistances connecting the electrical signals to the electronic matrix and arranged in combinations common to more than one character.

As shown in Fig. 12, the signals from decoding circuit 81 delivered by outputs 119 are connected by means of various combinations of diodes 126 to leads 127 which are connected to the matrix circuit 128 to be described hereinafter. In U.S. Patent No. Re. 23,713, the signals representative of the characters are connected to the tubes of the matrix by resistors. By this method, a large number of resistors are connected to each tube because any one tube may be associated with a number of characters. As a result, it was found to be preferable to use non-linear resistors, such as germanium crystal diodes, in order to prevent attenuation of the signal. Also, since many characters are made up of similar combinations of dots, it was found that a network of such diodes could be made in which such common combinations would result in using approximately one-half the number of diodes otherwise required. For example, the vertical line of the letter E is common to the letters F, H, K, L, M, N, P, R and W. In Fig. 12, lines 119 representing these letters are connected by the diodes more specifically designated by numerals 129 and 130 to a group of seven diodes 131 connected by lines 127 to the seven positions in matrix 128 corresponding to the first vertical stroke of the letter E. As shown in Fig. 12, the synthesizing network 125 is divided into three parts, a section 132 which comprises the combinations common to more than one character, a section 133 which comprises the portions of the characters not common to any character, and a section 134 which interconnects the first two sections to produce a complete character. As stated hereinbefore, by judicious use of this method, all the connections to the matrix can be made with about one-half the diodes otherwise required. The leads 127 are shown connected to sockets 135, each of which contains five such leads, the number of sockets being equivalent to the number of rows of elements in matrix 128.

Figure 13:
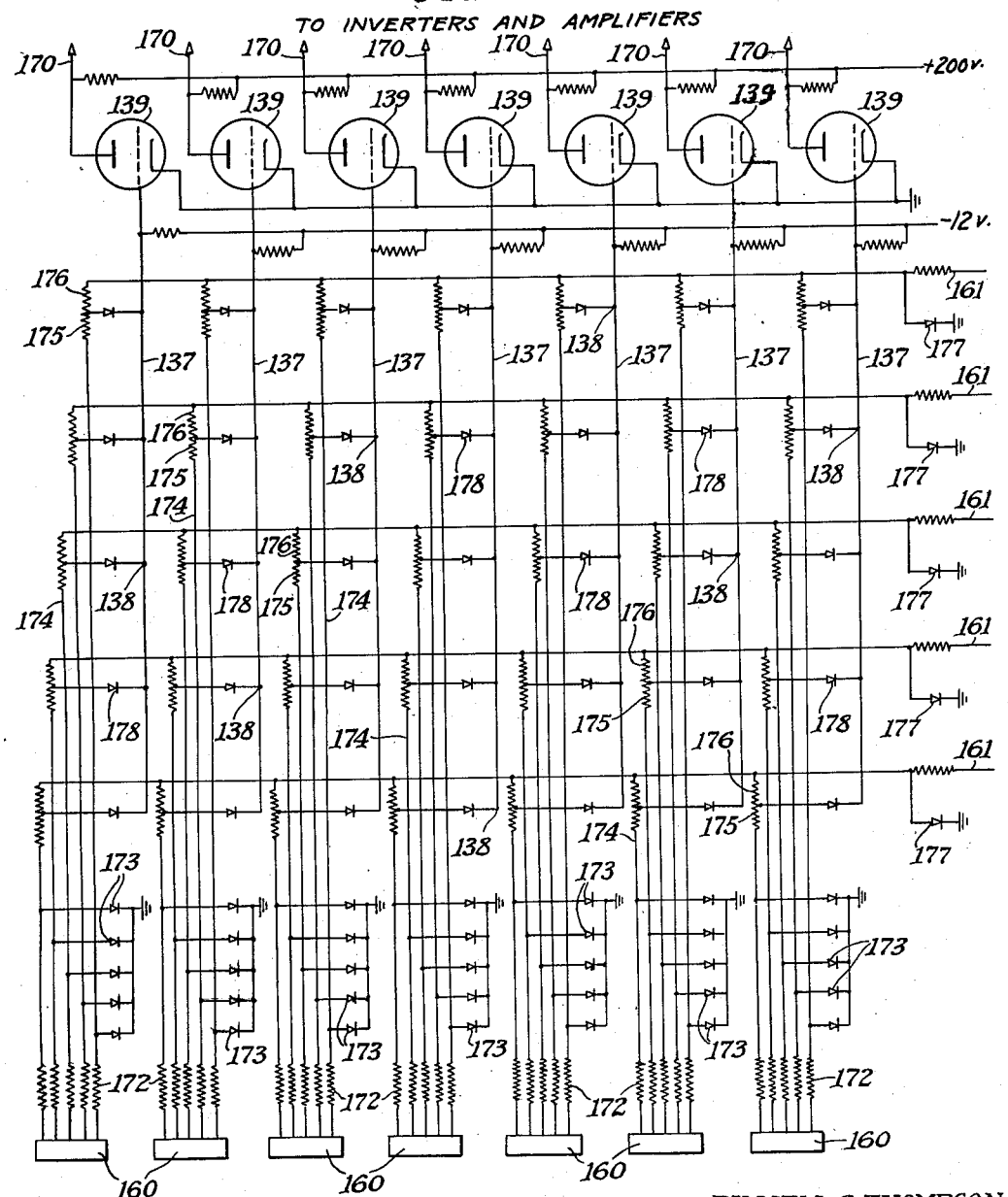
Fig. 13 is a wiring diagram of the electronic matrix.

For synthesizing the proper facsimile signals for reproducing a character represented by a single signal, the lines from plugs 160 are interconnected with lines 161 from flip-flop circuits 48 to form the matrix circuit 128 of five columns of seven rows which produces a single output at connection 138, as shown in Fig. 13. The resultant outputs from each connection 138 in a row are connected in parallel by lines 137 to the control grids of tubes 139, the plates of which are connected by lines 170 to amplifier-inverter stages 171, as disclosed in Fig. 1. The lines from plugs 160 and lines 161 from flip-flop circuits 48 are normally held at a negative voltage greater than 12 volts. When a character is to be printed, a positive signal appears on the appropriate lines connected to plugs 160, resistors 172 and diodes 173 limiting the rise in voltage so that the affected lines 174 are held at ground potential. Resistors 175 and 176 are equal in value so that when a line 174 is at ground potential and a line 161 is at minus 12 volts or greater, the grid of corresponding tube 139 will be at minus 6 volts or greater. Thus, tube 139 will remain cut off. When a positive signal from flip-flop circuits 48 appears on lines 161, it will be at ground potential due to diodes 177 and the corresponding tube 139 with a signal on one of lines 174 will then conduct. Diodes 178 are utilized to isolate the signals from different lines and, in effect, also acts as a switching means for permitting the resultant output of lines 160 and 161 to reach lines 137. The outputs of tubes 139 are connected to amplifier-inverter stages 171, as disclosed in Fig. 1. The outputs of the power tubes in the inverters are connected to printing coils 140 and 141 of electromagnetic driver 142 for operation of printing styli 143. When coils 141 are energized, the associated styli 143 are pressed against printing roller 144 which marks the paper 145 from the intervening carbon paper 146.

Specifically, the signal for the letter "E" delivered to line 119 in Fig. 12 is connected to line 147 by diode 148 which, in turn, is connected by means of diodes to the fifth line of the first and last of sockets 135. By means of diodes 149 and 151 line 119 is connected to lines 150 and 152 which, in turn, are connected, respectively, to the second, third and fourth lines of the last and first of sockets 135 by means of diodes 153 and 154. Diodes 129 and 130 connect line 119 to lines 155 and 156 which, in turn, are connected by diodes 131 to the first line of each of sockets 135. Finally, diodes 157 connect line 119 to the second and third lines of the fourth of sockets 135. The signal on line 119 is, therefore, delivered to the five lines of the first and seventh sockets, to the first line of the second, third, fifth and sixth sockets, and to the first, second and third line of the fourth socket and, correspondingly, to plugs 160 which receive sockets 135, the left hand plug in Fig. 13 mating with the left-hand socket in Fig. 12 which is considered as the first socket and numbering to the right. If the vertical group of diodes 178 to the left in Fig. 13 is considered as the first row and number to the left and the columns number from the bottom to the top, then all of the diodes in the first and seventh rows, the first diode in the second, third, fifth, and sixth rows, and the first, second and third diodes in the fourth row will permit the resultant output of decoder circuit 81 and flip-flop circuits 48 to render the respective tubes 139 conductive. The signals to connections 138, it will be noted, comprise a pattern forming the letter "E." However, the signal for conditioning tubes 139 is not completed until the positive signals from flip-flop circuit 48 are delivered by lines 161. As a result, the signals received on lines 161 are stepped from bottom to top, the first signal rendering all of tubes 139 conductive, the second and third lines rendering the first, last and center tube conductive and the fourth and fifth lines rendering the first and last tube conductive. The seven tubes 139 are, therefore, equivalent to one row of the seven dots and the flip-flop circuit steps this five times to provide the 7 x 5 rectangle in which the character is formed. The signals from tubes 139 delivered to inverters 171 cause the corresponding stylus 143 to be moved toward the printing roll 144 so that with the recording medium 145 moving at the proper speed, the character, or letter E, will be built up thereon from end to end, that is, the vertical leg of the "E" will first be printed and then the horizontal extensions thereof. Inverters 171 are a type of known push-pull amplifier comprising a normally conducting tube V1 and a normally non-conducting tube V2 in which an input signal applied to the grid of tube V1 renders it non-conducting and makes tube V2 conducting whereby two outputs of opposite polarity are obtained from the plate circuits of the tubes. Inverters 171 can be of the type disclosed in the above-mentioned U.S. Patent No. Re. 23,713. Since the first and seventh pulses from the flip-flop circuits 48 are not associated with the matrix and the recording medium is moved continuously, the interval between the fifth pulse and the second pulse provides the necessary spacing between adjacent letters or characters, as shown in Fig. 4.

To summarize and correlate the various circuits reference is made particularly to Fig. 1. The carbon paper 146 and paper tape 145 are brought together and fed over printing roller 144 and moved with respect to styli 143. After printing, the paper and carbon are separated and wound up on separate take-up reels. Since cards 10 contain four lines of intelligence, it is necessary to provide a printer for each line as well as associated circuits. Therefore, the various signals will be noted for only one area except where a particular circuit is connected to each of the other and corresponding circuits. The light transmitted through the first line of code on card 10 in area A energizes corresponding photocells 14 to produce a number of electrical signals in accordance with the code. These signals together with the disc signal from amplifier 24 are amplified and gated by the code distribution circuit 29 and deliver corresponding signals on the lines connecting said signals to terminals on sockets 28. Ring chain 26 steps the signals from successive lines of code to the corresponding socket 28 for read-in to the proper coil of the corresponding memory assembly and for conditioning corresponding thyratron 38. The output coils 36 in any one line or assembly having a signal induced therein by signals on the read-in coils delivers such signal by one or more of lines 50 to the corresponding flip-flop circuits in the group of circuits 80. The leads 161 from flip-flop circuits 48 are delivered to each of the matrix circuits 128 and step ring chain circuits 47 connected to each of memory circuits 31. In this way, the delivery of signals from each of distribution circuits 29 are synchronized with each other as well as the printing of each line by styli 143 of each printer assembly. From this point, the above description completely follows a signal indicative of a character, such as the letter "E" just described, through synthesizing circuit 125 and matrix 128. For decreasing the amount of plate current under D.C. conditions, circuits 163 comprising a high resistance 164 and capacitor 165 can be utilized to couple the power tubes of amplifier-invertors 171 to coils 140 and 141. Under A.C. conditions, capacitor 165 allows full supply voltage to be impressed on coils 140 and 141.

The arrangement of the diodes 178 and connections 138 has for convenience of description been referred to as a matrix but it will be appreciated that the term matrix relates to the functional relationship of the signals derived from the punched cards and from flip-flop circuits 48 and in nowise limits their actual spatial positions. Also, it will be obvious to those skilled in the art that the function of diodes 178 and connections 138 may be performed by other circuit arrangements which will furnish a printing signal only when two signals are received simultaneously. Also, while electromagnetically-actuated styli for carbon paper recording have been described for printing, it is to be understood that the facsimile signals synthesized in accordance with the invention may be employed to actuate any of the well-known facsimile recording heads.

Since the various circuits described for the purpose of disclosing the features of the invention may be modified by those skilled in the art, the scope of the invention is defined by the appended claims.

What we claim as new and desire to secure by Letters Patent of the United States is:

1. Apparatus for translating into visual representation the characters represented by code arranged on a medium in successive lines comprising means for scanning said lines and providing output pulses in accordance with the code in each line and individual to the character represented thereby, distribution means for receiving said output pulses and delivering successive electrical signals representative of the coded character in each of said scanned lines, memory means connected to said distribution means for receiving said electrical signals in any predetermined order and delivering said electrical signals successively in a fixed and predetermined order, a plurality of switching means each requiring two simultaneously applied signals to complete a switching operation arranged in the equivalent of columns and rows of a matrix, a circuit network connected to said memory means and to said matrix so that said switching means in each column common to more than one character are conditioned by any one of said electrical signals representative of such characters, the outputs of said switching means in each row being connected in parallel, marking means for following each of a multiplicity of collateral paths extending along a surface on which the representation is to appear, each of said marking means being individual to a corresponding row of said switching means, circuit means for applying to said columns of said switching means in rapid succession a signal simultaneously with said electrical signal to provide an output, and means controlled by the output of each row of said switching means for operating the corresponding marking means.

2. Apparatus for translating into visual representation the characters represented by code arranged on a medium in successive lines comprising a scanning station, means for advancing said medium continuously past said station, means arranged at said station for scanning said lines and providing output pulses in accordance with the code in each line and individual to the character represented thereby, synchronizing means operatively connected to said advancing means for providing output pulses in synchronism with the output pulses of said scanning means, distribution means for receiving said synchronized output pulses and delivering electrical signals representative of the coded character in each of said scanned lines, memory means connected to said distribution means for receiving said electrical signals in any predetermined order and delivering said electrical signals successively in a fixed and predetermined order, a plurality of switching means, each requiring two simultaneously applied signals to complete a switching operation, arranged in the equivalent of the columns and rows of a matrix, a circuit network connected to said memory means and to said matrix so that said switching means in each column common to more than one character are conditioned by any one of said electrical signals representative of such characters, the outputs of said switching means in each row being connected in parallel, marking means for following each of a multiplicity of collateral paths extending along a surface on which the representation is to appear, each of said marking means being individual to a corresponding row of said switching means, circuit means for applying to said columns of switching means in rapid succession a signal simultaneously with said electrical signal to provide an output, and means controlled by the output of each row of said switching means for operating the corresponding marking means.

3. Apparatus for translating into visual representation the characters represented by code arranged on a medium in successive lines and in predetermined areas thereof comprising means for simultaneously scanning said lines in each of said areas and providing output pulses in accordance with the code in each line and individual to the characters represented thereby, distribution means associated with each of said scanning means for receiving said output pulses and delivering electrical signals representative of the coded character in each of said simultaneously scanned lines, memory means connected to each of said distribution means for receiving said electrical signals in any predetermined order with respect to said lines and to said areas and delivering said electrical signals successively in a fixed and predetermined order, a plurality of switching means, each requiring two simultaneously applied signals to complete a switching operation, arranged in the equivalent of the columns and rows of matrixes, the matrixes being equal in number to said scanned areas, a circuit network connected to each of said memory means and to each of said matrixes so that said switching means in each column common to more than one character are conditioned by any one of said electrical signals representative of such characters, the outputs of said switching means in each row of said matrixes being connected in parallel, marking means for following each of a multiplicity of collateral paths along a surface on which the representation is to appear, each of said marking means being individual to a corresponding row of said switching means and the number of marking means being equivalent to the total number of rows of switching means in said matrixes, circuit means for applying to said columns of switching means in each matrix in rapid succession a signal simultaneously with said electrical signal to each column of each matrix to provide an output, and means controlled by the output of each row of said switching means for operating the corresponding marking means of each matrix to produce said representations on said surface in a number of spaced parallel lines equivalent to the number of said areas.

4. Apparatus for translating into visual representation coded information arranged on mediums in successive lines and in predetermined areas thereof and coded information common to said mediums arranged on a single medium in successive lines and in an area thereof other than that corresponding to any of the predetermined areas of said mediums comprising means for scanning successively and simultaneously the lines of each of said predetermined areas and providing output pulses in accordance with the code in each line and individual to the characters represented thereby, pulse generating means rendered operative by said single medium for providing output pulses in accordance with the code in each line and individual to the characters represented thereby and in synchronism with the output pulses of said scanning means, distribution means associated with each of said scanning means and said pulse generating means for receiving said output pulses and delivering successive electrical signals representative of the coded characters in corresponding lines of said areas, memory means associated with each of said distribution means for receiving said electrical signals in any predetermined order and delivering said electrical signals successively in a fixed and predetermined order, a plurality of switching means arranged in the equivalent of columns and rows of matrixes, the number of matrixes being equivalent to the number of areas having said coded information, a circuit network connected to each of said memory means and to each of said matrixes so that said switching means in each column common to more than one character are conditioned by any one of said electrical signals representative of such characters, the outputs of said switching means in each row of said matrixes being connected in parallel, marking means for following each of a multiplicity of collateral paths along a surface on which the representation is to appear, each of said marking means being individual to a corresponding row of said switching means and the number of marking means being equivalent to the total number of rows of switching means in said matrixes, circuit means for applying to said columns of switching means in each matrix in rapid succession a signal simultaneously with said electrical signal to each column of each matrix to provide an output, and means controlled by the output of each row of said switching means for operating the corresponding marking means of each matrix to produce said representation on said surface in a number of spaced parallel lines equivalent to the number of said areas.

5. Apparatus for translating into visual representation coded information arranged on mediums in successive lines and in predetermined areas thereof, at least one and the same line in the same area of each medium being representative of the same character, comprising photoelectric means for simultaneously scanning said lines in each of said areas and providing output pulses in accordance with the code in each line and individual to the characters represented thereby, distribution means associated with each of said scanning means for receiving said output pulses and delivering electrical signals representative of the coded character in each of said simultaneously scanned lines, memory means connected to each of said distribution means for receiving said electrical signals in any predetermined order with respect to said lines and to said areas and delivering said electrical signals in a fixed and predetermined order, a plurality of switching means arranged in the equivalent of the columns and rows of matrixes, the matrixes being equal in number to said scanned areas, a circuit network connected to each of said memory means and to each of said matrixes so that said switching means in each column common to more than one character are conditioned by any one of said electrical signals representative of such characters, the outputs of said switching means in each row of said matrixes being connected in parallel, marking means for following each of a multiplicity of collateral paths along a surface on which the representation is to appear, each of said marking means being individual to a corresponding row of said switching means and the number of marking means being equivalent to the total number of rows of switching means in said matrixes, circuit means for applying to said columns of switching means in each matrix in rapid succession a signal simultaneously with said electrical signal to each column of each matrix to provide an output, means controlled by the output of each row of said switching means for operating the corresponding marking means of each matrix to produce said representation on said surface in a number of spaced parallel lines equivalent to the number of said areas, and an auxiliary memory circuit connected to the distribution means associated with the scanning means of said area in which said same line is representative of the same character and to the respective circuit network for providing an electrical signal to the corresponding matrix only when a pulse other than that indicative of the same character is received to cause said marking means to make a representation on said surface indicative of such change in said character.

6. Apparatus for translating into visual representation coded information punched in cards in successive lines and in predetermined areas thereof, at least one and the same line in the same predetermined area of each of said cards being representative of the same character, and coded information common to said cards punched in a single card in successive lines and in an area thereof other than an area corresponding to said predetermined areas comprising a scanning station, advancing means for continuously moving said cards through said scanning station, photoelectric means arranged in said station for simultaneously and successively scanning said lines in each of said predetermined areas and providing output pulses in accordance with the code in each line and individual to the characters represented thereby, pulse generating means rendered continuously operative by said single card for providing output pulses in accordance with the code in each line and individual to the characters represented thereby, synchronizing means operatively connected to said advancing means for providing output pulses in synchronism with the output pulses of said photoelectric means and pulse generating means, distribution means associated with each of said photoelectric means and said pulse generating means for receiving said synchronized output pulses and delivering electrical signals representative of the coded character in each of said lines in said areas, memory means connected to each of said distribution means for receiving said electrical signals in any predetermined order with respect to said lines and to said areas and delivering said electrical signals in a fixed and predetermined order, a plurality of switching means arranged in the equivalent of the columns and rows of matrixes, the matrixes being equal in number to said scanned areas, a circuit network connected to each of said memory means and to each of said matrixes so that said switching means in each column common to more than one character are conditioned by any one of said electrical signals representative of such characters, the outputs of said switching means in each row of said matrixes being connected in parallel, marking means for following each of a multiplicity of collateral paths along a surface on which the representation is to appear, each of said marking means being individual to a corresponding row of said switching means and the number of marking means being equivalent to the total number of rows of switching means in said matrixes, circuit means for applying to said columns of switching means in each matrix in rapid succession a signal simultaneously with said electrical signal to each column of each matrix to provide an output, means controlled by the output of each row of said switching means for operating the corresponding marking means of each matrix to produce said representation on said surface in a number of spaced parallel lines equivalent to the number of said areas, and an auxiliary memory circuit connected to the distribution means associated with the scanning means of said area in which said same line is representative of the same character and to the respective circuit network for providing an electrical signal to the corresponding matrix only when a pulse other than that indicative of the same character is received to cause said marking means to make a representation on said surface indicative of such change in said character.

7. A memory device for providing predetermined electrical signals to indicate a change in electrical signals as represented by a binary coded character arranged on a medium and common to a plurality of said mediums comprising distribution means for providing from the code on said medium a series of electrical signals on a plurality of terminals individual to the character represented by the code on said medium, a static magnetic assembly including a number of units equivalent to the number of elements in the binary code, each unit having a core, read-in coil, read-out coil and output coil, inverter means associated with each of said units for controlling the electrical signals on said terminals to both said read-in and read-out coils, said inverter means permitting magnetization of said read-in coils in one direction when the electrical signals on said terminal are the same for successive mediums and permitting magnetization of at least one of said read-out coils in an opposite direction when electrical signals other than the electrical signals representative of the coded character are applied, and an output circuit including the output coils of said units for providing said predetermined electrical signals from the electric signals induced in said output coils when the direction of magnetization is reversed with respect to said read-in and read-out coils.

8. A memory device for providing predetermined electrical signals to indicate a change in electrical signals as represented by a binary coded character arranged on a medium and common to a plurality of said mediums comprising distribution means for providing from the code on said medium a series of electrical signals on a plurality of terminals individual to the character represented by the code on said medium, a static magnetic assembly including a number of units equivalent to the number of elements in the binary code, each unit having a core, read-in coil, read-out coil and output coil, and electrical means associated with each of said units for feeding the electrical signals on said terminals to said read-in coils to magnetize said coils in the same direction when the electrical signals on said terminal are the same for successive mediums and to magnetize at least one of said read-out coils in the opposite direction when electrical signals other than the electrical signals representative of the coded character are applied to said terminals for providing said predetermined electrical signals from the signals induced in said output coils when the direction of magnetization is reversed with respect to said read-in and read-out coils.

9. A memory device for providing predetermined electrical signals to indicate a change in electrical signals as represented by a binary coded character arranged on a medium and common to a plurality of said mediums comprising distribution means for providing from the code on said medium a series of electrical signals on a plurality of terminals individual to the character represented by the code on said medium and providing on one of said terminals a triggering circuit, a static magnetic assembly including a number of units equivalent to the number of elements in the binary code and a gaseous discharge tube having an anode, a control grid connected to said one terminal and a cathode connected to ground, each unit having a core, read-in coil, read-out coil and output coil, electrical inverter means associated with each of said units for feeding the electrical signals on said terminals to one side of the read-in coils, the other side of said coils being connected to said anode and for magnetizing said read-in coils in the same direction when the electrical signals on said terminals are the same for successive mediums and magnetizing at least one of said read-out coils in an opposite direction when electrical signals other than the electrical signals representative of the coded character are applied to said terminals, an output circuit including a rectifier connected across the ends of each output coil for maintaining constant polarity, and an amplifier circuit connected to said rectifiers for providing said electrical signals from the electrical signals induced in said output coils when the direction of magnetization is reversed with respect to said read-in and read-out coils.

10. A device for providing cyclically repetitious electrical signals from a plurality of pairs of contacts arranged in successive lines, each line having a number of said pairs of contacts equivalent to the elements in a predetermined binary code, and individually movable from a normally-open position to a closed position for representing a coded character in each of the lines, pulse generating means connected to one of said contacts in each of said pairs in the same line for cyclically and repetitiously applying a pulse simultaneously to said contacts in the same line and successively to said contacts in each line, and amplifier means connected to each of the other contacts in each line for providing successive series of electrical signals from the pulses delivered thereto through said contacts in the closed position, each series of signals being representative of the coded character in a line and simultaneously applied to the respective terminals of successive connectors.

11. A device for providing cyclically repetitious electrical signals from a single medium having an area in which a predetermined number of apertures can be punched in each of a plurality of successive lines, the apertures punched in each of said lines being representative of characters in binary code, comprising a plurality of pairs of normally closed contacts arranged in accordance with said predetermined number of apertures and movable to an open position by said medium when inserted therebetween, the contacts aligned with said apertures in each of said lines remaining in the closed position, pulse generating means connected in series circuit to one of said contacts in each of said pairs in the same line for cyclically and repetitiously applying a pulse simultaneously to said contacts in the same line and successively to said contacts in each line, and amplifier means connected to each of the other contacts in each line for providing successive series of electrical signals from the pulses delivered thereto through the contacts in each line permitted to remain closed by said medium, each series of signals being representative of the coded characters in a line and simultaneously applied to the respective terminals of successive connectors.

12. A device for providing cyclically repetitious electrical signals from a single medium having an area in which a predetermined number of apertures can be punched in each of a plurality of successive lines, the apertures punched in each of said lines being representative of characters in binary code, comprising a plurality of pairs of normally-closed contacts arranged in accordance with said predetermined number of apertures and movable to an open position by said medium when inserted therebetween, the contacts aligned with said apertures in each of said lines remaining in the closed position, pulse generating means including a ring chain circuit connected to one of said contacts in each of said pairs in the same line through an isolating diode for cyclically and repetitiously applying a pulse simultaneously to said contacts in the same line and successively to said contacts in each line, and amplifier means connected to each of the other contacts in each line for providing successive series of electrical signals from the pulses delivered thereto through the contacts in each line permitted to remain closed by said medium, each series of signals being representative of the coded characters in a line and simultaneously applied to the respective terminals of successive connectors.

13. A memory device for delivering in a predetermined order electrical signals stored therein and representative of binary coded characters arranged on a medium in successive lines comprising distribution means for providing from the code elements in each line on said medium a series of electrical signals individual to the character represented thereby and applying each series of signals simultaneously to the respective terminals of successive connectors, a plurality of static magnetic assemblies equivalent in number to the successive lines on said medium and connected to said connectors in an order for receiving said signals for storage in said predetermined order, each assembly having a number of units in accordance with the number of elements in the binary code and each unit including a core, read-in coil, read-out coil and output coil, a read-in circuit associated with each of said assemblies and connected to the respective assembly connector for magnetizing in one direction only the read-in coils corresponding to said series of electrical signals in conjunction with the application of said signals to the connector by said distribution means, a read-out circuit associated with each of said assemblies, for pulsing the read-out coils of each assembly successively to magnetize said read-out coils in the other direction when no signals are applied to said read-in coils, an output circuit associated with corresponding units of each assembly for receiving the signals induced in said output coils, when the magnetization of the corresponding read-in coils is reversed from that of said read-out coils, and a control circuit for initiating said read-out circuits successively to release said series of stored electrical signals in said predetermined order and in timed relation to the storage of said signals by said read-in circuit.

14. A memory device for delivering in a predetermined order electrical signals stored therein and representative of binary coded characters arranged on a medium in successive lines comprising distribution means for providing from the code elements in each line on said medium a series of electrical signals individual to the character represented thereby, circuit means for stepping said distribution means in accordance with said lines and delivering each series of electrical signals simultaneously and successively to the respective terminals of successive connectors, a plurality of static magnetic assemblies equivalent in number to the successive lines on said medium, each assembly having a number of units in accordance with the elements in the binary code and each unit including a core, read-in coil, read-out coil and output coil, a read-in circuit associated with each of said assemblies including a gaseous discharge tube having an anode connected to each of said read-in coils, the other side of each coil being connected to respective terminals on one of said connectors in accordance with the predetermined order of delivery, a control grid connected to said circuit means through said one of said connectors and a cathode connected to ground, for magnetizing in one direction only the read-in coils corresponding to said series of electrical signals, said circuit means initiating said read-in circuits successively to render said tubes conductive in conjunction with the application of said signals to each connector by said distribution means, a read-out circuit associated with each of said assemblies and including a second gaseous discharge tube having an anode connected in series circuit with said read-out coils and a voltage source, a control grid and a cathode connected to ground, a second circuit means common to said read-out circuits and connected to the control grids of said second tubes and voltage source for pulsing and stepping said voltage source successively to said read-out circuits to render said second tubes successively conductive for magnetizing said read-out coils in each assembly in the other direction to release said series of stored electrical signals in said predetermined order and in timed relation to the storage of said signals by said first-mentioned circuit means, and output circuits associated with corresponding output coils in each assembly, said corresponding output coils having one side connected to ground and the other side connected through an isolating diode to a common output for receiving the signals induced in said output coils when the magnetization of the corresponding read-in coils is reversed from that of said read-out coils.

15. Apparatus for translating a series of potentials applied to a series of input connections each individual to a particular character into a succession of series of electrical signals corresponding series-by-series to a line-by-line scanning of the characters comprising a plurality of switching means each requiring two concurrently applied signals to complete a switching operation and arranged equivalent to the columns and rows of a matrix, the switching means in each row having a common output connection to which a signal is applied upon completion of a switching operation of any switching means in a column, means for applying in columnar sequence one conditioning signal simultaneously to all the switching means in a column, and a network of nonlinear resistors interconnecting said switching means in said matrix with said series of input connections and connected in combinations for conditioning, when energized by a potential on one of said input connections, a pattern of said switching means in said matrix corresponding to the shape of the character represented by the potential on said one input connection.

16. Apparatus for translating a series of potentials applied to a series of input connections each individual to a particular character into a succession of series of electrical signals corresponding series-by-series to a line-by-line scanning of the characters comprising a plurality of switching means each requiring two concurrently applied signals to complete a switching operation and arranged equivalent to the columns and rows of a matrix, the switching means in each row having a common output connection to which a signal is applied upon completion of a switching operation of any switching means in a column, means for applying in columnar sequence one conditioning signal simultaneously to all the switching means in a column, and a network of non-linear resistors comprising three sections, a first section connected in combination for conditioning combinations of input connections corresponding to parts of a pattern common to more than one character, a second section for conditioning an individual input connection corresponding to parts of a pattern individual to the character represented by the input potential, and a third section interconnecting said first and second sections to said switching means for conditioning, when energized by a potential on one of said input connections, a pattern of said switching means in said matrix corresponding to the shape of the character represented by the potenial on said one input connection.

17. Apparatus for translating a series of potentials applied to a series of input connections each individual to a particular character into a succession of electrical signals corresponding series-by-series to a line-by-line scanning of the character comprising a plurality of non-linear resistors, each requiring two concurrently applied signals to complete a switching operation and arranged equivalent to the columns and rows of a matrix, one side of each non-linear resistor in each column in the matrix being connected via an individual resistor to a first input connection common to each column for simultaneously applying a conditioning signal to all the non-linear resistors in that column and via a second individual resistor to a second input connection common to each row, and the other side of each non-linear resistor in each row being connected to a common output connection and to the control grids of an electron tube normally biased to cut-off and rendered conductive by the concurrent application of signals to said first and second input connections, means for applying in columnar sequence to said first input connections one conditioning signal simultaneously to all the non-linear resistors in a column, and a network of non-linear resistors comprising three sections, a first section connected in combination for conditioning combinations of input connections corresponding to parts of a pattern common to more than one character, a second section for conditioning an individual input connection corresponding to parts of a pattern individual to the character represented by the input potential, and a third section interconnecting said first and second connections to said second input connection for conditioning, when energized by a potential on one of said input connections, a pattern of said non-linear resistors in said matrix corresponding to the shape of the character represented by the potential on said one input connection.

References Cited in the file of this patent
UNITED STATES PATENTS

| | | |
|---|---|---|
| 2,554,835 | Nallina | May 29, 1951 |
| 2,570,716 | Rochester | Oct. 9, 1951 |
| 2,575,017 | Hunt | Nov. 13, 1951 |
| 2,604,538 | Halvorsen | July 22, 1952 |
| 2,620,395 | Snijers | Dec. 2, 1952 |
| 2,691,155 | Rosenberge et al. | Oct. 5, 1954 |
| 2,719,962 | Karnaugh | Oct. 4, 1955 |
| 2,729,807 | Paivinen | Jan. 3, 1956 |

OTHER REFERENCES

"Digital Memory Systems," by Isaac L. Auerbach, "Electrical Manufacturing," October 1953, pp. 100 to 107.

"Static Magnetic Memory for Low-Cost Computers," by M. Kincaid et al., "Electronics," January 1951, pages 108–11.

"Ferrite Speed Digital Computers," D. R. Brown et al., "Electronics," April 1953, pages 146–149.